(12) United States Patent
Tschanz et al.

(10) Patent No.: US 7,376,849 B2
(45) Date of Patent: May 20, 2008

(54) METHOD, APPARATUS AND SYSTEM OF ADJUSTING ONE OR MORE PERFORMANCE-RELATED PARAMETERS OF A PROCESSOR

(75) Inventors: James W. Tschanz, Portland, OR (US); Stephen H. Tang, Pleasanton, CA (US); Siva G. Narendra, Portland, OR (US); Vivek K. De, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 422 days.

(21) Appl. No.: 10/879,486

(22) Filed: Jun. 30, 2004

(65) Prior Publication Data

US 2006/0020838 A1 Jan. 26, 2006

(51) Int. Cl.
*G06F 1/00* (2006.01)
(52) U.S. Cl. ............ 713/322; 713/300; 713/320
(58) Field of Classification Search ........ 713/300, 713/320, 322
See application file for complete search history.

(56) References Cited

U.S. PATENT DOCUMENTS

| | | | | |
|---|---|---|---|---|
| 5,903,182 A | * | 5/1999 | Jordan | ............ 327/540 |
| 6,081,143 A | * | 6/2000 | Ho et al. | ............ 327/166 |
| 7,036,030 B1 | * | 4/2006 | Altmejd | ............ 713/322 |
| 2002/0109489 A1 | * | 8/2002 | Shaver et al. | ............ 323/283 |
| 2003/0076153 A1 | * | 4/2003 | Shakeri et al. | ............ 327/534 |
| 2004/0017234 A1 | * | 1/2004 | Tam et al. | ............ 327/141 |
| 2004/0085085 A1 | | 5/2004 | Muhtaroglu et al. | |
| 2004/0119521 A1 | * | 6/2004 | Kurd et al. | ............ 327/291 |
| 2004/0260959 A1 | * | 12/2004 | Tani | ............ 713/300 |
| 2005/0040810 A1 | * | 2/2005 | Poirier et al. | ............ 324/158.1 |
| 2005/0091550 A1 | * | 4/2005 | Tani | ............ 713/320 |
| 2005/0192773 A1 | * | 9/2005 | Sheng et al. | ............ 702/132 |
| 2005/0283629 A1 | * | 12/2005 | Tanaka et al. | ............ 713/322 |

OTHER PUBLICATIONS

2002 IEEE International Solid-State Circuits Conference: ISSCC 2002/ Session 16/ High Speed I/O/ 16.4: "1.1V 1GHz Communications Router with On-Chip Body Bias in 150 nm CMOS"; Siva Narendra et al. Microprocessor Research Labs, Intel Corporation, Hillsboro, OR.

2003 IEEE International Solid-State Circuits Conference: ISSCC 2003/ Session 6/ Low-Power Digital Techniques/ Paper 6.1: "Dynamic-Sleep Transistor and Body Bias for Active Leakage Power Control of Microprocessors"; James Tschanz et al.

\* cited by examiner

*Primary Examiner*—Thomas Lee
*Assistant Examiner*—Malcolm D Cribbs
(74) *Attorney, Agent, or Firm*—Pearl Cohen Zedek Latzer, LLP

(57) ABSTRACT

Embodiments of the present invention provide a method, apparatus and system for dynamically adjusting one or more performance-related parameters of a processor core based on at least one operation parameter related to an operating condition of the processor core.

15 Claims, 6 Drawing Sheets

METHOD, APPARATUS AND SYSTEM OF ADJUSTING ONE OR MORE PERFORMANCE-RELATED PARAMETERS OF A PROCESSOR

BACKGROUND OF THE INVENTION

The temperature of a processor may be related to an activity factor of one or more circuits of the processor core, e.g., the higher the activity factor of the circuits the higher the temperature of the processor core. In order to ensure proper operation of the processor, all circuits of the processor core must be verified to be functional at the highest expected temperature ("the throttling temperature", denoted $T_{tr}$) of the processor core.

Conventional processors may be designed to operate at frequencies lower than or equal to a preset maximal frequency $F(T_{tr})$ related to the throttling temperature, e.g., as long as the temperature of the processor core is lower than $T_{tr}$. If the temperature of the processor core exceeds the throttling temperature, then the processor may "throttle", i.e., the frequency of the processor core may be reduced and, if necessary, the voltage supplied to the processor may be reduced, e.g., until the temperature of the processor is reduced to a value lower than $T_{tr}$, at which point the frequency of the processor may be increased, e.g., back to $F(T_{tr})$, and so on.

The performance of the processor core may also be affected by a droop of the voltage supplied to the processor, e.g., the maximal frequency of the processor core may be reduced as a result of the voltage droop. In order to guarantee operation of the processor with an expected minimal voltage, $V_{ccmin}$, in conventional processors the operating frequency of the processor is predetermined to be not higher than a frequency, $F(V_{ccmin})$, related to $V_{ccmin}$. Conventional processors may include a plurality of decoupling capacitors associated with the processor core and/or to a package of the processor. These capacitors may reduce the affect of the voltage droop on the processor. However, such capacitors are relatively expensive.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
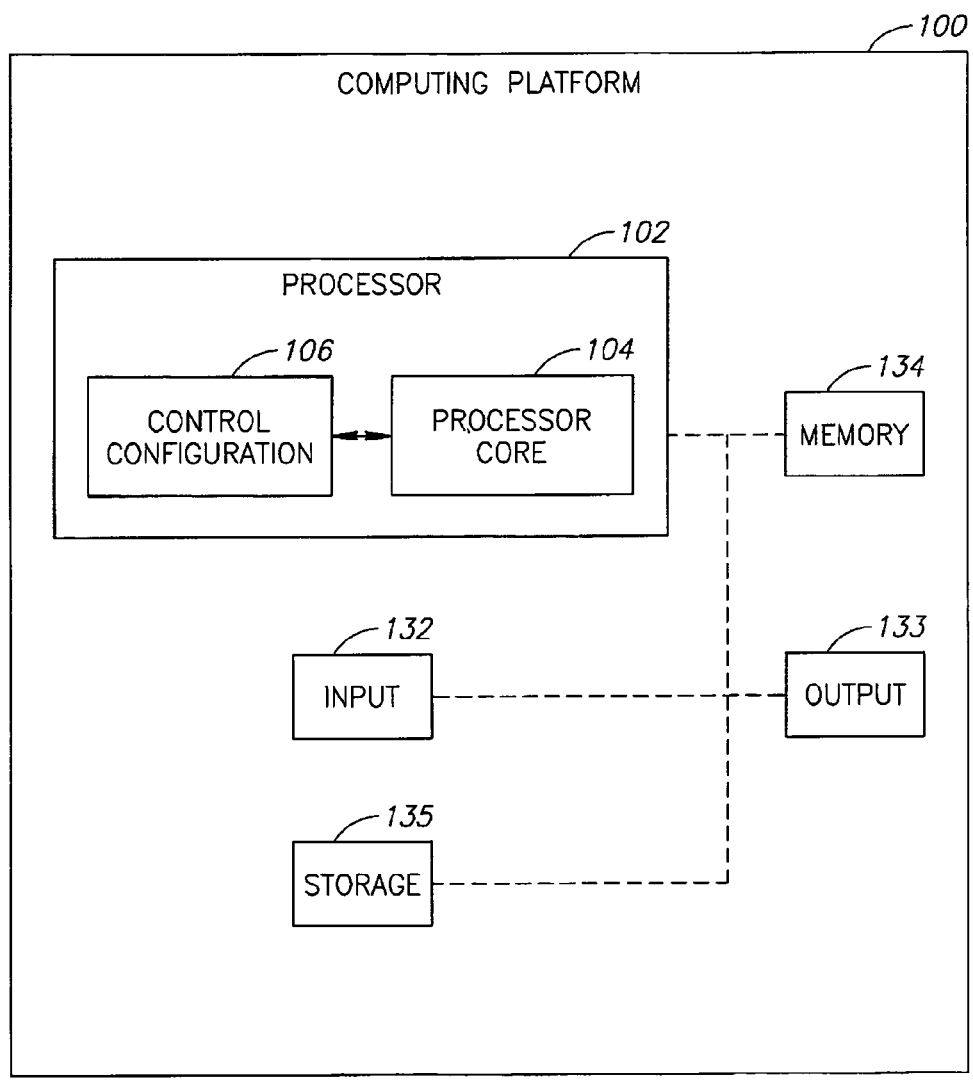
FIG. 1 is a schematic illustration of a computing platform including at least one processor according to some exemplary embodiments of the invention.

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF EMBODIMENTS OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits may not have been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

Reference is made to FIG. 1, which schematically illustrates a computing platform 100 including at least one processor 102 according to some exemplary embodiments of the present invention.

According to some exemplary embodiments, processor 102 may include, for example, a Central Processing Unit (CPU), a Digital Signal Processor (DSP), a microprocessor, a host processor, a plurality of processors, a controller, a chip, a microchip, or any other suitable multi-purpose or specific processor or controller.

According to some exemplary embodiments of the invention, processor 102 may include a processor core 104 and a control configuration 106 able to dynamically adjust one or more performance-related parameters of processor core 104 based on at least one operation parameter related to an operating condition of processor core 106, e.g., as described below.

According to some exemplary embodiments of the invention, computing platform 100 may also include at least one input unit 132, at least one output unit 133, at least one memory unit 134, and/or at least one storage unit 135.

Computing platform 100 may additionally include other suitable hardware components and/or software components. In some embodiments, computing platform 100 may include or may be, for example, a personal computer, a desktop computer, a mobile computer, a laptop computer, a notebook computer, a terminal, a workstation, a server computer, a Personal Digital Assistant (PDA) device, a tablet computer, a network device, or other suitable computing device.

Input unit 132 may include, for example, a keyboard, a mouse, a touch-pad, or other suitable pointing device or input device. Output unit 133 may include, for example, a Cathode Ray Tube (CRT) monitor, a Liquid Crystal Display (LCD) monitor, or other suitable monitor or display unit.

Storage unit 135 may include, for example, a hard disk drive, a floppy disk drive, a Compact Disk (CD) drive, a CD-Recordable (CD-R) drive, or other suitable removable and/or fixed storage unit.

Memory unit 134 may include, for example, a Random Access Memory (RAM), a Read Only Memory (ROM), a Dynamic RAM (DRAM), a Synchronous DRAM (SD-RAM), a Flash memory, a volatile memory, a non-volatile memory, a cache memory, a buffer, a short term memory unit, a long term memory unit, or other suitable memory units or storage units.

Figure 2:
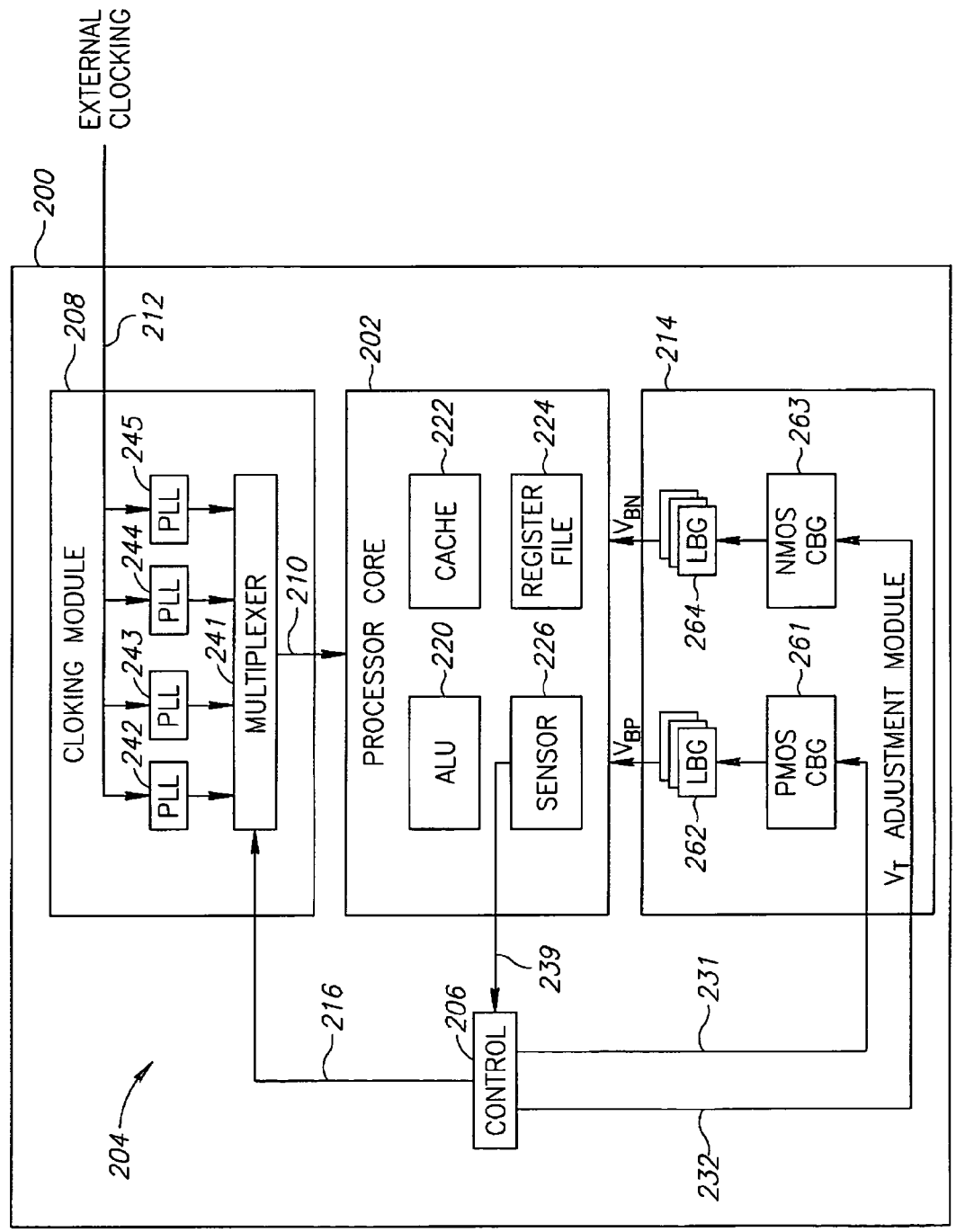
FIG. 2 is a schematic illustration of a processor including a processor core and a control configuration according to one exemplary embodiment of the invention.

Reference is made to FIG. 2, which schematically illustrates a processor 200 according to one exemplary embodiment of the invention. Processor 200 may include a processor core 202 and a control configuration 204. Although the invention is not limited in this respect, processor 200 may be used to perform the functionality of processor 102 of FIG. 1.

According to exemplary embodiments of the invention, processor core 202 may include one or more Arithmetic Logic Units (ALU) 220, caches 222, register files 224 and/or any other suitable hardware components, e.g., as known in the art. At least some of the components of processor core 202 may include one or more transistors (not shown), e.g., N-channel metal-oxide-semiconductor (NMOS) transistors and/or P-channel metal-oxide-semiconductor (PMOS) transistors, as are known in the art.

According to some exemplary embodiments of the invention, control configuration 204 may be able to dynamically adjust a frequency, F, of core 202, which may be defined, for example, as an internal clock frequency provided to core 202, and/or a voltage threshold, $V_T$, e.g., of one or more of the transistors of core 202, based on at least one operation-parameter related to an operating condition of core 202, e.g., as described in detail below. By dynamically adjusting the voltage threshold $V_T$, configuration 204 may be able to dynamically adjust, for example, a top frequency, $F_M$, of core 202, which may be defined, for example, as a maximal and/or optimal frequency at which core 202 may be allowed to operate, as described below.

According to exemplary embodiments of the invention, processor core 202 may also include one or more sensors 226 able to sense the at least one operation-parameter at one or more parts of processor core 202. Sensors 226 may be adapted to produce a signal, e.g., a digital signal 239, corresponding to the measured operation-parameter of processor core 202. According to some exemplary embodiments of the invention, different sensors 226 may be associated with different parts of processor core 202, for example, ALU 220, cache 222, register file 224 and/or any other part of processor core 202, e.g., as described below.

In the exemplary embodiments of FIG. 2, sensors 226 may include one or more temperature sensors able to sense the temperature at one or more parts of processor core 202. Sensors 226 may be adapted to produce signal 239 corresponding to a measured temperature, T of processor core 202. According to some exemplary embodiments of the invention, different sensors 226 may be associated with different parts of processor core 202, for example, ALU 220, cache 222, register file 224 and/or any other part of processor core 202. For example, sensors 226 may be associated with one or more areas ("hot spots") that are predisposed to heat up more than other areas on the average. Sensors 226 may include any suitable temperature sensors, e.g., a multi trip-point temperature sensor, i.e., a sensor adapted to produce signal 239 having a value corresponding to one of a plurality of temperature ranges, as is known in the art. For example, signal 239 may have a first value, e.g., if $T \leq T1$, a second value, e.g., if $T1 < T \leq T2$, a third value, e.g., if $T2 < T \leq T3$, or a fourth value, e.g., if $T3 < T$, wherein T1, T2, T3 and T4 may be predetermined values.

According to exemplary embodiments of the invention, control configuration 204 may include a controller 206, a variable-frequency clocking module 208 and a threshold voltage adjustment module 214, as are described in detail below.

According to exemplary embodiments of the invention, controller 206 may be adapted to control clocking module 214, and/or module 214 based on the measured one or more operation parameters, as described below.

According to exemplary embodiments of the invention, clocking module 208 may include any suitable variable-frequency clocking module able to provide processor core 202 with an internal clock signal 210 of a frequency corresponding to a value of a control signal 216, e.g., received from controller 206. For example, module 208 may include a multiplexer 241 and a plurality of Phase Locked Loops (PLLs), e.g., PLLs 242-245, each locked at a predetermined different frequency, as are known in the art. For example, each PLL may be set at a division ratio corresponding to the respective predetermined frequency as is known in the art. At least some of PLLs 242-245 may receive an external clock signal 212, e.g., from an external clocking unit (not shown). Multiplexer 241 may be adapted to select an output of one of PLLs 242-245, such that the selected PLL output provides processor core 202 with internal clock signal 210 having a frequency corresponding to the value of control signal 216. For example, PLLs 242, 243, 244 and 245 may be locked at four predetermined frequencies $F_1$, $F_2$, $F_3$, and $F_4$, respectively, and multiplexer 241 may select the output of one of PLL 242, 243, 244 or 245 based on the value of signal 216. According to other embodiments of the invention, clocking unit 208 may include a single PLL. According to these embodiments, the operation of processor core 202 may be halted while the PLL is locked at a frequency corresponding to the value of signal 216, e.g., using a "SpeedStep" method or any other suitable clocking frequency adjustment method known in the art.

According to exemplary embodiments of the invention, module 214 may include any suitable module adapted to adjust threshold voltage $V_T$ of one or more of the transistors of processor core 202. For example, module 214 may be adapted to apply to at least some of the NMOS and/or PMOS transistors of processor core 202 a body bias voltage, i.e., a module 214 may apply a non-zero voltage between the body and the source of the transistors. For example, module 214 may include a PMOS Central Bias Generator (CBG) 261 able to receive a digital PMOS bias value from controller 206, e.g., via signal 231, and to provide a corresponding analog PMOS bias voltage value, $V_{BP}$, to a first set of Local Bias Generators (LBG) 262. LBGs 262 may be adapted to provide the bias voltage $V_{BP}$ to the body terminal of at least some PMOS transistors of processor core 202. Module 214 may also include a NMOS CBG 263 able to receive a digital NMOS bias value from controller 206, e.g., via signal 232, and to provide a corresponding analog NMOS bias voltage value, $V_{BN}$, to a second set of LBGs 264. LBGs 264 may be adapted to provide the bias voltage $V_{BN}$ to the body terminal of at least some NMOS transistors of processor core 202. Module 214 may include any suitable configuration, e.g., including any desired number and/or arrangement of CBGs 261 and 263 and/or LBGs 262 and 264, e.g., as known in the art. For example, module 214 may include a body bias module as described in James Tschanz et al., "Dynamic-Sleep Transistor and Body Bias for Active Leakage Power Control of Microprocessors", ISSCC 2003/session 6/Low Power Digital Techniques/Paper 6.1, or in Siva Narendra et al., "1.1V 1 GHz Communications with On-Chip Body Bias in 150 nm CMOS", ISSCC 2002/session 16/High Speed I/O/16.4.

A leakage power L of processor core 202, i.e., the power consumed by processor core 202 when processor core is at an idle state and receiving a zero clocking signal, and/or the top frequency $F_M$ of core 202 may be related to the threshold voltage $V_T$ of the transistors of processor core 202. For example, the higher the threshold voltage $V_T$ the lower the top frequency $F_M$ and leakage power L of processor core 202. The lower the threshold voltage $V_T$ the higher the top frequency $F_M$ and leakage power L of processor core 202. The threshold voltage $V_T$ may be adjusted, for example, by applying a body bias voltage to at least some of the transistors of processor core. For example, $V_T$ may be decreased by applying a Forward Body Bias (FBB) voltage, and increased by applying a Reverse Body Bias (RBB) voltage. Thus, according to exemplary embodiments of the invention, the frequency F and/or the top frequency $F_M$ of processor core 202 may be dynamically controlled by adjusting the frequency of internal clock signal 210 and/or by adjusting the body bias voltage applied to processor core 202, e.g., as described herein.

According to some exemplary embodiments of the invention, control configuration 204 may be able to dynamically adjust the frequency F and/or the threshold voltage $V_T$ based on the measured temperature T of processor core 202, e.g., as described in detail below.

According to exemplary embodiments of the invention, controller 206 may be adapted to control clocking module 208, and/or module 214 based on the measured temperature T, e.g., as described below.

According to some exemplary embodiments of the invention, controller 206 may include a Look Up Table (LUT), e.g., a Read Only Memory (ROM) or a programmable LUT, adapted to provide signals 216, 231 and/or 232 having predetermined values corresponding to the measured temperature T, e.g., according to a predetermined relationship between a desired value of the frequency F and the values of the temperature T and/or the threshold voltage $V_T$. For example, although the invention is in no way limited in this respect, controller 206 may include a LUT corresponding to at least part of the following values:

TABLE 1

| T (signal 239) | Input Frequency (signal 216) | $V_{BN}$ (signal 232) | $V_{BP}$ (Signal 231) |
|---|---|---|---|
| T ≤ T1 | $F_1$ | $V_{BN1}$ | $V_{BP1}$ |
| T1 < T ≤ T2 | $F_2$ | $V_{BN2}$ | $V_{BP2}$ |

TABLE 1-continued

| T (signal 239) | Input Frequency (signal 216) | $V_{BN}$ (signal 232) | $V_{BP}$ (Signal 231) |
|---|---|---|---|
| T2 < T ≤ T3 | $F_3$ | $V_{BN3}$ | $V_{BP3}$ |
| T3 < T | $F_4$ | $V_{BN4}$ | $V_{BP4}$ | wherein the values T1-T3, $F_1$-$F_4$, $V_{BN1}$-$V_{BN4}$, and/or $V_{BP1}$-$V_{BP4}$ may be experimentally predetermined based on the specific design of processor core 202.

It will be appreciated by those skilled in the art, that according to other embodiments of the invention, controller 206 may include any other suitable hardware adapted to produce signals 216, 231 and/or 232 according to the measured temperature T.

Figure 3A:
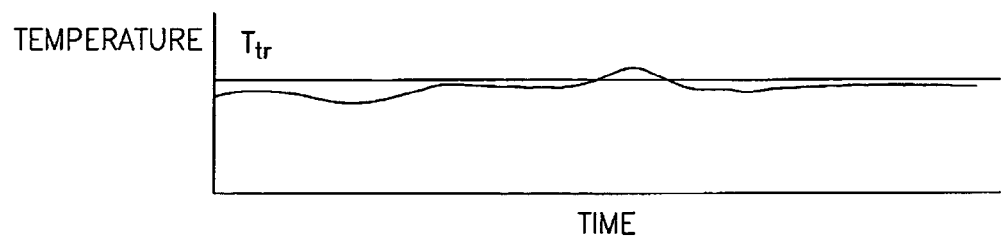
FIGS. 3a-3c are schematic illustrations of graphs depicting a temperature of the processor core of FIG. 2, a body bias voltage applied to transistors of the processor core of FIG. 2, and a frequency of the processor core of FIG. 2, respectively, versus time, according to one exemplary embodiment of the invention.
Figure 3B:
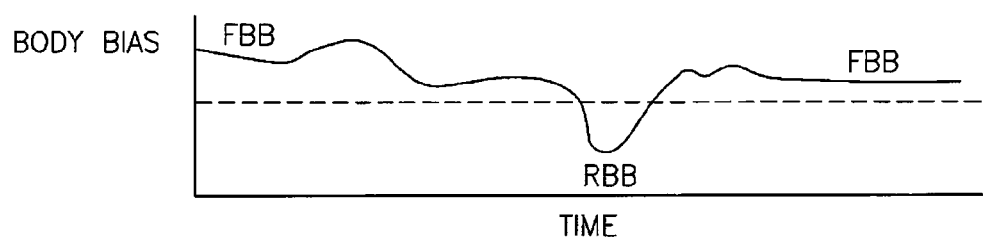
Figure 3C:
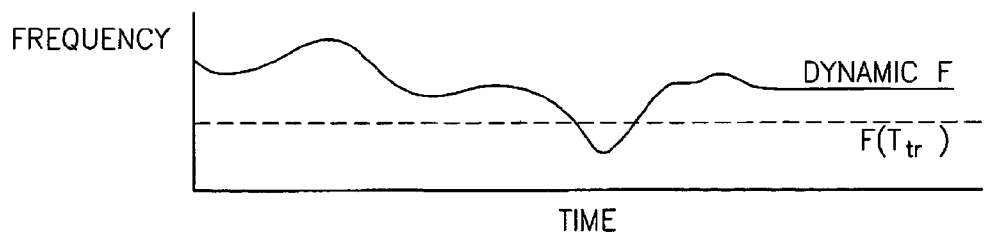

Reference is made to FIGS. 3a-3c, which schematically illustrate graphs depicting the temperature T, the body bias voltage applied to the transistors of processor core 202, and the frequency of processor core 202, respectively, versus time, according to an exemplary embodiment of the invention.

As illustrated in FIGS. 3a-3c, if the temperature of processor core 202 is lower than a predetermined temperature threshold value, e.g., a predetermined throttling temperature $T_{tr}$, then controller 216 may be able to control module 214 to apply FBB to processor core 202, e.g., in order to increase the top frequency $F_M$, and/or to control clocking module 208 to increase the frequency of internal clocking input 210, e.g., as described above. This may result in an increase in the temperature T. If the temperature T is higher than the temperature throttling value $T_{tr}$, then controller 216 may be able to control module 214 to apply RBB to processor core 202, and/or to control clocking module 208 to decrease the frequency of internal clocking input 210, as described above. This may result in a decrease in the temperature T. Thus, control configuration 204 may dynamically adjust the frequency F and/or the threshold voltage $V_T$ to maintain processor core 202 at a generally narrow range of temperature values, e.g., generally equal to $T_{tr}$. Furthermore, processor core 202 may be operated at relatively high frequencies, e.g., including frequencies higher than a throttling frequency $F(T_{tr})$, i.e., a predetermined frequency corresponding to $T_{tr}$. Thus, it will be appreciated by those skilled in the art that processor 200 may have improved performance in relation to conventional processors, which may operate at a constant maximal frequency, e.g., the frequency $F(T_{tr})$, with relation to the temperature T, and/or may implement a throttling phase for reducing the temperature of the processor core.

Aspects of the invention are described herein in the context of an exemplary embodiment of a control configuration, e.g., control configuration 204 being part of a processor, e.g., processor 200. However, it will be appreciated by those skilled in the art that, according to other embodiments of the invention, any other combination of integral or separate units may also be used to provide the desired functionality; for example, one or more elements of the control configuration, e.g., controller 206, module 208 and/or module 214, may be implemented separately from the processor.

Some exemplary embodiments of the invention are described above in relation to a control configuration, e.g., configuration 204, able to dynamically adjust the frequency F, and/or the threshold voltage $V_T$, of one or more transistors of a processor core, e.g., processor core 202, based on a measured temperature T, of the processor core. However it will be appreciated by those skilled in the art that according to other embodiments of the invention the control configuration may be able to dynamically adjust any one or more suitable performance-related parameters of the processor core based on any one or more measured operation related parameters of the processor core, e.g., as described below.

Figure 4:
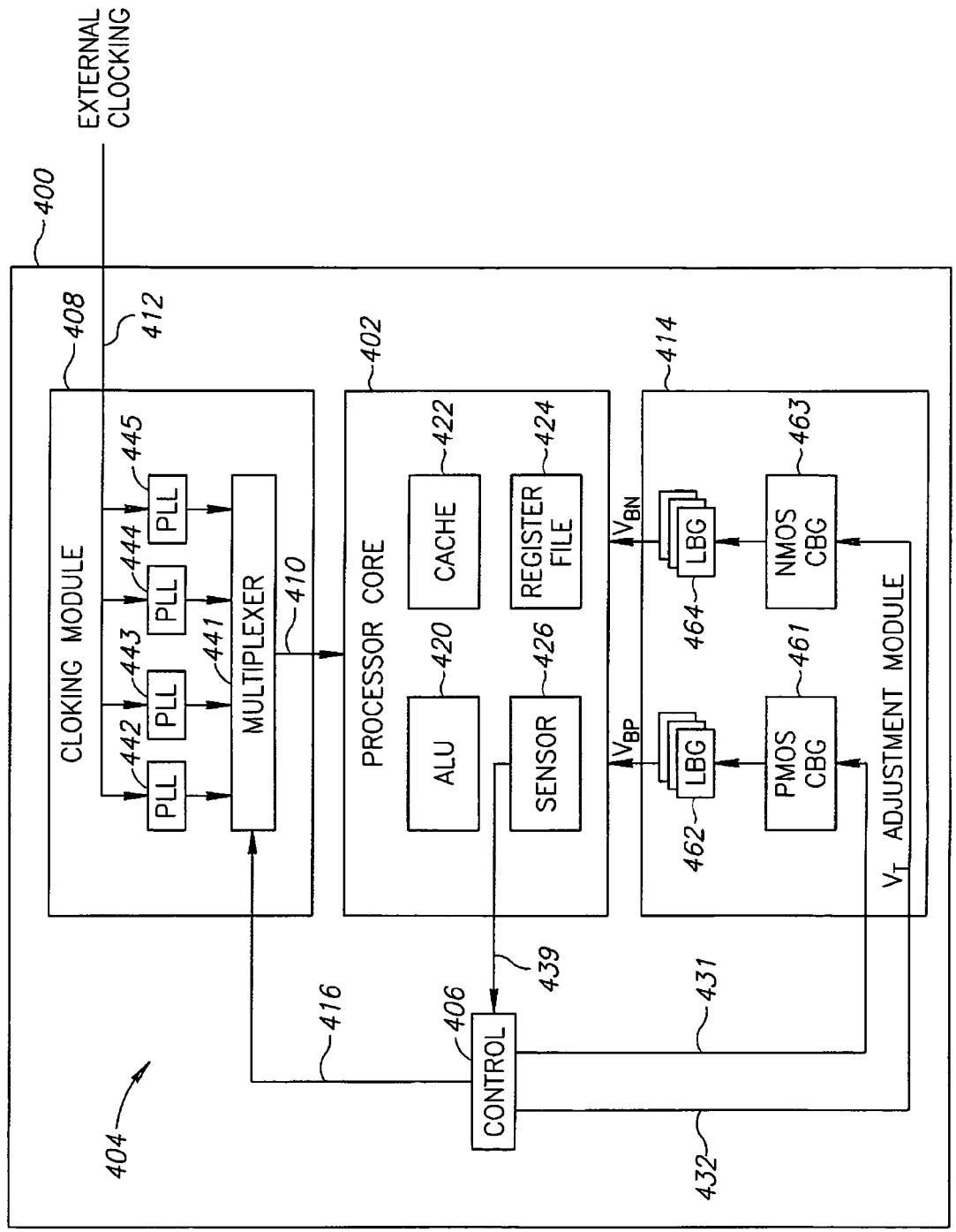
FIG. 4 is a schematic illustration of a processor including a processor core and a control configuration according to another exemplary embodiment of the invention.

Reference is made to FIG. 4, which schematically illustrates a processor 400 according to another exemplary embodiment of the invention. Processor 400 may include a processor core 402 and a control configuration 404. Although the invention is not limited in this respect, processor 400 may be used to perform the functionality of processor 102 of FIG. 1.

According to some exemplary embodiments of the invention, control configuration 404 may be able to dynamically adjust the frequency F and/or the threshold voltage $V_T$ of core 402 based on a measured voltage droop $Vcc_{droop}$ in the voltage V, supplied to processor core 402, e.g., as described in detail below.

According to exemplary embodiments of the invention, processor core 402 may include one or more Arithmetic Logic Units (ALU) 420, caches 422, register files 424 and/or any other suitable hardware components, e.g., as known in the art. At least some of the components of processor core 402 may include one or more transistors (not shown), e.g., NMOS and/or PMOS transistors, as are known in the art.

According to exemplary embodiments of the invention, processor core 402 may include at least one voltage droop sensor, which may be associated with one or more parts of processor core 402. Sensor 426 may be adapted, for example, to provide a signal 439 corresponding to the measured voltage droop $Vcc_{droop}$, i.e., the difference between the measured voltage Vcc supplied to processor core 402 and a nominal supply voltage $Vcc_{nom}$. Sensor 426 may include any suitable voltage droop sensor, as is known in the art.

According to exemplary embodiments of the invention, processor 400 may also include a controller 406, a variable-frequency clocking module 408, and a threshold voltage adjustment module 414. Controller 406 may be adapted to control module 414 and/or module 408 based on the measured voltage droop $Vcc_{droop}$, as described in detail below.

According to exemplary embodiments of the invention, a FBB may be applied to processor core 402 to increase the top frequency $F_M$, e.g., in order to maintain a desired operative level of processor core 402 during a voltage droop event. The value of FBB applied to processor core 402 may be related to the value of the measured voltage droop $Vcc_{droop}$. For example, the higher the value of the measured voltage droop $Vcc_{droop}$, the higher the value of the FBB applied to processor core 402. If substantially no voltage droop is measured, then a Zero Body Bias (ZBB) may be applied to processor core 402.

According to some exemplary embodiments of the invention, controller 406 may include a Look Up Table (LUT), e.g., a Read Only Memory (ROM) or a programmable LUT, adapted to provide signals 431 and/or 432 having predetermined values corresponding to the measured voltage droop $Vcc_{droop}$, e.g., according to a predetermined relationship between the values of the voltage droop $Vcc_{droop}$ and the threshold voltage $V_T$. For example, although the invention is in no way limited in this respect, the LUT of controller 406 may include at least part of the following values:

TABLE 2

| $Vcc_{droop}$ (signal 439) | Input Frequency (signal 416) | $V_{BN}$ (signal 432) | $V_{BP}$ (Signal 431) |
|---|---|---|---|
| $Vcc_{droop} \leq Vcc_{droop1}$ | $F_5$ | $V_{BN5}$ | $V_{BP5}$ |
| $Vcc_{droop1} < Vcc_{droop} \leq Vcc_{droop2}$ | $F_6$ | $V_{BN6}$ | $V_{BP6}$ |

TABLE 2-continued

| $Vcc_{droop}$ (signal 439) | Input Frequency (signal 416) | $V_{BN}$ (signal 432) | $V_{BP}$ (Signal 431) |
|---|---|---|---|
| $Vcc_{droop2} < Vcc_{droop} \leq Vcc_{droop3}$ | $F_7$ | $V_{BN7}$ | $V_{BP7}$ |
| $Vcc_{droop3} < Vcc_{droop}$ | $F_8$ | $V_{BN8}$ | $V_{BP8}$ | wherein the values $Vcc_{droop1}$-$Vcc_{droop3}$, $V_{BN5}$-$V_{BN8}$, $F_5$-$F_8$, and/or $V_{BP5}$-$V_{BP8}$ may be experimentally predetermined, e.g., based on the specific design of processor core 402, such that a desired frequency of the processor core may be maintained by applying the body bias values $V_{BN}$ and/or $V_{BP}$ corresponding to the measured voltage droop value $Vcc_{droop}$.

It will be appreciated by those skilled in the art, that according to other embodiments of the invention, controller 406 may include any other suitable hardware adapted to produce signals 431 and/or 432 according to the measured voltage droop $Vcc_{droop}$.

Some exemplary embodiments of the invention are described above in relation to a control configuration including a controller able to control a variable-frequency clocking module, and a threshold voltage adjustment module. However it will be appreciated by those skilled in the art that according to other embodiments of the invention, the control configuration may include only one of the variable-frequency clocking module and the threshold voltage adjustment module. For example, controller 406 may be adapted to control only clocking module 408, e.g., to reduce the frequency of clocking signal 410 when a voltage droop is measured. Alternatively, controller may be able to control only module 414, e.g., to apply a FBB to processor core 402 when a voltage droop is measured.

Figure 5A:
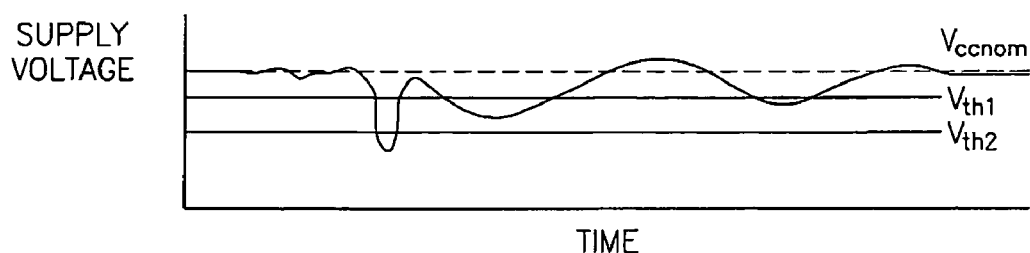
FIGS. 5a-5c are schematic illustrations of graphs depicting a supply voltage of the processor core of FIG. 4, a body bias voltage applied to transistors of the processor core of FIG. 4, and a frequency of the processor core of FIG. 4, respectively, versus time, according to another exemplary embodiment of the invention.
Figure 5B:
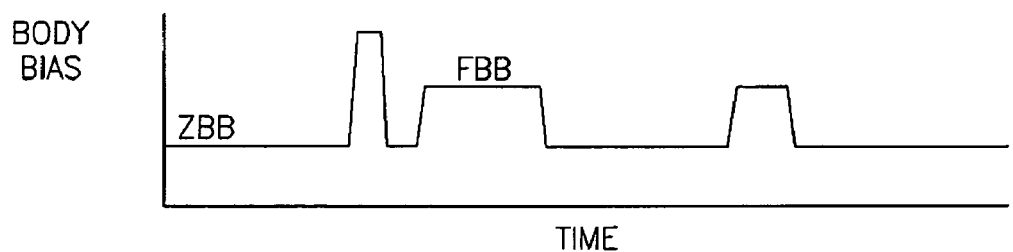
Figure 5C:
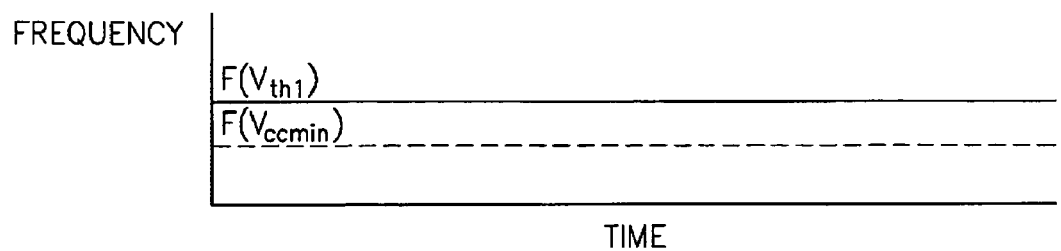

Reference is made to FIGS. 5a-5c, which schematically illustrate graphs depicting the supply voltage Vcc, the body bias voltage applied to transistors of processor core 402, and the frequency F of processor core 402, respectively, versus time, according to an exemplary embodiment of the invention, e.g., wherein the frequency F is substantially constant and controller 406 is able to control the threshold voltage $V_T$.

As illustrated in FIGS. 5a-5c, controller 416 may control the value of the body bias applied to processor core 402 based on the value of the measured voltage droop $Vcc_{droop}$, e.g., in order to maintain processor core 402 at a desired frequency. For example, ZBB may be applied to processor core 402, e.g., if the supply voltage Vcc is higher than a first predetermined threshold voltage value $V_{th1}$. A first FBB value may be applied to processor core 402, e.g., if the supply voltage is lower than $V_{th1}$ and higher than a second threshold voltage value $V_{th2} < V_{th1}$. A second FBB value, higher than the first FBB value, may be applied to processor core 402, e.g., if the supply voltage is lower than $V_{th2}$. Thus, control configuration 404 may dynamically adjust the threshold voltage of one or more of the transistors of processor core 420 to maintain processor core 402 at a relatively high frequency F, e.g., higher than a predetermined constant threshold frequency $F(V_{ccmin})$ corresponding to a "worst case" voltage supply value $V_{ccmin}$. Thus, it will be appreciated by those skilled in the art that processor 400 may have improved performance in relation to conventional processors, which may operate at a constant, non-ideal, frequency, e.g., the frequency $F(V_{ccmin})$.

Some exemplary embodiments of the invention are described above in relation to a control configuration able to dynamically adjust the frequency F of a processor core and/or the threshold voltage $V_T$, of one or more transistors of the processor core based on one measured operation parameter of the processor core, for example, the temperature T of the processor core, e.g., as described above with reference to FIG. 2, or the voltage droop, e.g., as described above with reference to FIG. 4. However it will be appreciated by those skilled in the art that according to other embodiments of the invention the control configuration may be able to dynamically adjust any one or more suitable performance-related parameters of the processor core based on any one or more measured operation parameters of the processor core, separately or in combination. For example, the control configuration may be able to dynamically adjust the one or more performance related parameters based on a combination of the measured temperature, the measured voltage droop and/or any other suitable operation related parameter.

Figure 6:
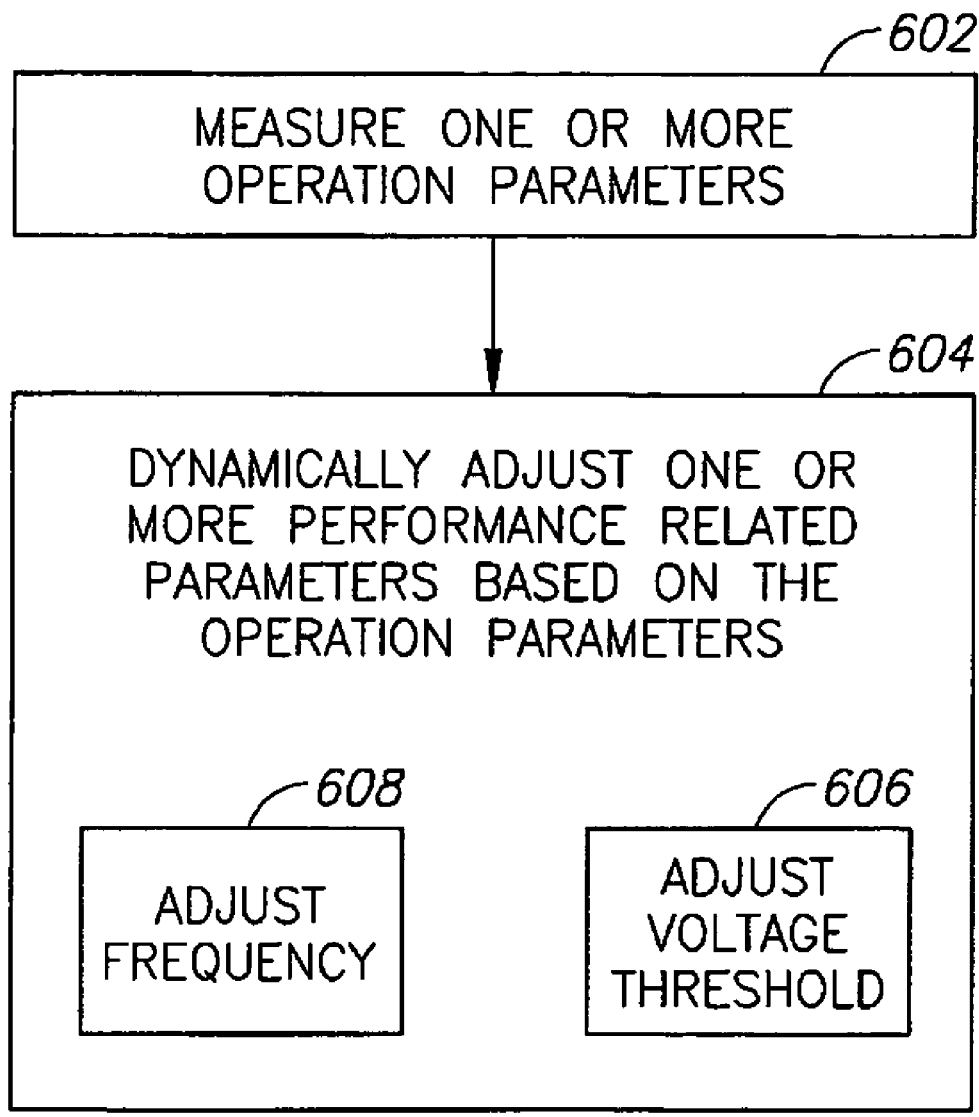
FIG. 6 is a schematic illustration of a flow chart of a method of dynamically adjusting one or more performance-related parameters of a processor core according to some exemplary embodiments of the invention.

Reference is made to FIG. 6, which schematically illustrates a method of dynamically adjusting one or more performance-related parameters of a processor core according to some exemplary embodiments of the invention.

As indicated by block 602, the method may include measuring one or more operation parameters related to an operation condition of the processor core, e.g., as described above with reference to FIG. 2 and/or FIG. 4.

As indicated by block 604, the method may also include dynamically adjusting one or more performance-related parameters of the processor core based on one or more of the measured operation parameters, e.g., as described above with reference to FIG. 2 and/or FIG. 4.

As indicated at block 606, dynamically adjusting one or more performance-related parameters may include adjusting a threshold voltage of one or more transistors of the processor core, e.g., as described above with reference to FIG. 2 and/or FIG. 4.

As indicated at block 608, dynamically adjusting one or more performance-related parameters may additionally or alternatively include adjusting a frequency of an internal clock signal provided to the processor core, e.g., as described above with reference to FIG. 2 and/or FIG. 4.

Embodiments of the present invention may be implemented by software, by hardware, or by any combination of software and/or hardware as may be suitable for specific applications or in accordance with specific design requirements. Embodiments of the present invention may include units and sub-units, which may be separate of each other or combined together, in whole or in part, and may be implemented using specific, multi-purpose or general processors, or devices as are known in the art. Some embodiments of the present invention may include buffers, registers, storage units and/or memory units, for temporary or long-term storage of data and/or in order to facilitate the operation of a specific embodiment.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

What is claimed is:

1. An apparatus comprising:
one or more parameter adjustment modules able to adjust one or more performance-related parameters of a processor core, respectively; and
a controller able to receive an input responsive to at least one operation parameter related to an operating condition of said processor core and, based on said at least one operation parameter, to dynamically control said one or more parameter adjustment modules by applying a desired body bias voltage to one or more transistors of said processor core and adjusting a frequency of an internal clock signal,
wherein said one or more parameter adjustment modules comprise an internal clocking module able to adjust a division ratio between an external clock signal and said internal clock signal according to a frequency control signal received form said controller and to provide said processor core with said internal clock signal having a desired frequency.

2. The apparatus of claim 1, wherein said one or more performance-related parameters comprise one or both of a top frequency of said processor core and a threshold voltage of said one or more transistors.

3. The apparatus of claim 1, wherein said at least one operation parameter comprises one or both of a temperature and a voltage droop.

4. The apparatus of claim 1, wherein said one or more parameter adjustment modules comprise a threshold voltage module able to adjust said threshold voltage.

5. The apparatus of claim 4, wherein said threshold voltage module comprises a body bias module able to controllably apply said desired body bias voltage to said one or more transistors.

6. The apparatus of claim 1, wherein said controller comprises a look-up-table able to provide said one or more parameter adjustment modules with one or more control signals, respectively, according to the value of said at least one operation parameter.

7. The apparatus of claim 1, wherein said apparatus comprises one or more sensors to measure said at least one operation parameter.

8. A method comprising:
dynamically controlling one or more performance-related parameters of a processor core based on at least one operation parameter related to an operating condition of said processor core by applying a desired body bias voltage to one or more transistors of said processor core and adjusting a division ratio between an external clock signal and an internal clock signal according to a frequency control signal and providing said processor core with said internal clock signal having a desired frequency.

9. The method of claim 8, wherein said one or more performance-related parameters comprise one or both of a top frequency of said processor core and a threshold voltage of said one or more transistors.

10. The method of claim 8 comprising measuring said at least one operation parameter.

11. The method of claim 10, wherein measuring said at least one operation-parameter comprises measuring one or both of a temperature of said processor core and a voltage droop related to said processor core.

12. A computing platform comprising:
a processor including a processor core and a control configuration, the control configuration comprising:
one or more parameter adjustment modules able to adjust one or more performance-related parameters of a processor core, respectively; and
a controller able to receive an input responsive to at least one operation parameter related to an operating condition of said processor core and, based on said at least one parameter, to dynamically control said one or more parameter adjustment modules by applying a desired body bias voltage to one or more transistors of said processor core and adjusting a frequency of an internal clock signal, wherein said one or more parameter adjustment modules comprise an internal clocking module able to adjust a division ratio between an external clock signal and said internal clock signal according to a frequency control signal received form said controller and to provide said processor core with said internal clock signal having a desired frequency.

13. The computing platform of claim 12, wherein said one or more performance-related parameters comprise one or both of a top frequency of said processor core and a threshold voltage of said one or more transistors of said processor core.

14. The computing platform of claim 12, wherein said at least one operation parameter comprises one or both of a temperature and a voltage droop.

15. The computing platform of claim 12, wherein said controller comprises a look-up-table able to provide said one or more parameter adjustment modules with one or more control signals, respectively, according to the value of said at least one operation parameter.

* * * * *